United States Patent [19]

Frank

[11] Patent Number: 4,491,296
[45] Date of Patent: Jan. 1, 1985

[54] DIAPHRAGM DRIVE FOR CONTROLLING THE OPERATION OF A GAS BURNER

[76] Inventor: Hermann T. Frank, Fliederstrasse 4, 6229 Niederwalluf, Fed. Rep. of Germany

[21] Appl. No.: 519,900

[22] Filed: Aug. 3, 1983

Related U.S. Application Data

[63] Continuation of Ser. No. 256,256, Apr. 22, 1981, abandoned.

[30] Foreign Application Priority Data

Aug. 18, 1980 [DE]  Fed. Rep. of Germany ....... 3031134

[51] Int. Cl.³ .......................................... F16K 31/122
[52] U.S. Cl. ........................................ 251/14; 251/57; 251/61.2; 251/100; 431/89
[58] Field of Search ............... 431/89; 251/14, 57, 251/66, 61.2, 100, 295

[56] References Cited

U.S. PATENT DOCUMENTS

| | | | |
|---|---|---|---|
| 580,574 | 4/1897 | Fowler | 251/100 |
| 2,051,294 | 8/1936 | Gauger | 251/14 |
| 2,169,247 | 11/1930 | Hill et al. | 251/14 |
| 2,226,761 | 12/1940 | Fox | 251/14 |
| 2,431,283 | 11/1947 | Spence | 251/14 |
| 2,558,681 | 6/1951 | Hachmeister | 239/434 |
| 2,577,967 | 12/1951 | Hughes | 251/61.2 |
| 2,585,045 | 2/1952 | Schmidlin | 251/14 |
| 3,075,537 | 1/1963 | Puster | 251/57 |
| 3,118,494 | 1/1964 | Yost et al. | 431/89 |
| 3,253,610 | 5/1966 | Pohl et al. | 251/14 |
| 4,332,108 | 10/1943 | Paille | 251/57 |

Primary Examiner—Samuel Scott
Assistant Examiner—Noah Kamen
Attorney, Agent, or Firm—W. G. Fasse; D. H. Kane, Jr.

[57] ABSTRACT

The operation of a gas burner, such as a Bunsen burner, is controlled by a remote control device including a diaphragm drive which responds to a fluid under pressure for operating the actuator of the burner whereby the gas supply is switched on or off. The diaphragm seals off a pressure chamber from a fuel gas supply chamber and is deformable by the pressure in the pressure chamber. Such deformation is transmitted to the burner actuator.

8 Claims, 4 Drawing Figures

DIAPHRAGM DRIVE FOR CONTROLLING THE OPERATION OF A GAS BURNER

This is a continuation of application Ser. No. 256,256, filed Apr. 22, 1981, now abandoned.

CROSS-REFERENCE TO RELATED APPLICATION

The present invention is based on corresponding German Ser. No. P 30 31 134.3 filed in the Federal Republic of Germany on Aug. 18, 1980. The priority of the German filing date is claimed for the present application.

BACKGROUND OF THE INVENTION

The present invention relates to a diaphragm drive mechanism for controlling the operation of a gas burner especially gas burners used in laboratories, such as Bunsen burners. More specifically, the invention relates to a diaphragm drive for the actuator of the main flame of a Bunsen burner for varying the size of the flame by remote control and to switch the flame on and off. Such an actuator mechanism comprises, for example, a valve disk cooperating with a valve seat and including a gasket as well as a valve spring and guiding means as well as throttling devices. Gas burners of the above type are simple in their structure and hence relatively inexpensive. Accordingly, such burners are frequently used in workshops, laboratories, and in many other fields. Further, such burners have normally, in addition to the main flame which may be switched on and off, a continuously burning small pilot light for igniting the main flame.

For certain jobs, the burning of the main flame is required only for a short period of time during which it is necessary to simultaneously perform other manual chores. Reference is made, as an example, to wax modeling, to the heating of instruments for their sterilization, and to externally exposing an apparatus to a flame treatment also for its sterilization. In connection with all these jobs, one achieves the following advantages in connection with a suitable remote control for the main flame which, for instance, may be actuated by a foot pedal. The gas consumption is reduced to the required quantity. The heating of the environment in which the burner is used is reduced, for example, in an apparatus, in a flue, or in an entire room. Thus, maintaining an agreeable room temperature is facilitated or air conditioning may be avoided altogether. Interfering turbulent air flows usually caused by unnececessary air heating are reduced. Avoiding or at least reducing turbulent air flows is advantageous in connection with laboratory work involving germs and in connection with work performed on so-called laminar flow benches.

Moreover, the remote control of the main flame, for example, by means of a foot pedal leaves both hands free for the actual job at hand.

Diamphragm drives cooperating with pressure transmitting fluidic media are known in connection with measuring devices, for example, manometers in which the diaphragm drive controls the operation of the pointer.

Further, diaphragm drives have been used for some time now in connection with air operated valves which are used in pipe conduits.

J. and R. Mueller describe in their book, "Adjustment Devices for Material Flows" (Stelleinrichtungen fuer Stoffstroeme) VEB-Verlag Technik, Berlin 1966, Page 65, such pneumatically operated valves which may be remotely controlled by air pressure, for example, for the purpose of controlling and regulating.

Gas burners, as they are used in laboratories and having a main flame which burns only during the time of actuation, are well known in the art. In such a burner, the main flame is, for example, switched on by applying pressure with the palm of the hand to a hand-operable plate. The flame is extinguished as soon as the plate is released. It is also known to keep the flame burning by rotating the plate into a locked position in which the operating plate is arrested for the duration during which the flame is supposed to burn. The operating plate is also known as a "wrist plate".

It is also known to equip gas burners for laboratories with a foot pedal control. These devices comprise an electromagnetic power unit which operates the actuator, or an electromagnetic valve is used instead of the electromagnetic power unit or in addition to such an actuator device.

It is frequently a hindrance if it is necessary to use a hand for the actuation of a gas burner because the operator needs his hands for other jobs. Thus, it is not unusual, that the gas burner is left burning with a large flame all the time, although it is not needed all the time.

The above mentioned use of diaphragm drives in connection with measuring devices serves primarily for the purpose of making a pressure or volume change visible by moving a pointer. Larger forces are not necessary for this purpose and would in fact impair the accuracy of the display. Thus, the diaphragm drives used in measuring devices are not suitable for driving an actuator. While it would be possible to drive a gas burner actuator with the membrane drive of a pneumatic valve, the structure of such pneumatic valve membrane drives is not suitable for gas burners because they are too large and bulky whereby the operation would be impaired.

An electromagnetic remote control of the main flame of a gas burner not only requires additional units in the remote control apparatus, such units in the form of solenoid magnets, are too large. Besides, such type of control requires an electrical supply and the required cables merely interfere with the proper use of the burner. Besides, an electrical connection constitutes an ignition source which should be avoided in connection with gas burners or with the gas supply conduit.

OBJECTS OF THE INVENTION

In view of the above, it is the aim of the invention to achieve the following objects singly or in combination:

to provide a simple remote control mechanism for the main flame of a gas burner, especially of the type as it is used in laboratories, such as a Bunsen burner;

to provide a remote control for a gas burner without the need for an electric power supply;

to construct a remote control mechanism for a gas burner which will increase the operational reliability and any accident hazard which may be involved with such gas burners;

to provide a remote control mechanism for the operation of a gas burner which is suitable for cooperation with other operating devices for enabling a versatile control;

to optimize the valve dimensions which are used in such burners, in other words to make the valves as small as possible;

to provide a remote control mechanism for the operation of a gas burner which mechanism is even suitable for installation in certain types of existing gas burners;

to provide a control device for a gas burner which enables the operator to have both hands free for other tasks; and to assure the immediate switch-off of the gas burner when a fault should occur in the membrane means.

SUMMARY OF THE INVENTION:

The remote control mechanism for a gas burner, such as a Bunsen or laboratory burner, according to the invention, comprises a deformable actuating diaphragm which closes or seals a pressure chamber filled with a pressure transmitting fluidic medium in such a manner that the diaphragm is deformed in response to a pressure change of the fluidic medium. The shape change of the diaphragm is effective on the actuating means. Gaseous as well as liquid material can be used for the pressure transmission. Air has been found to be especially advantageous.

Versatile control possibilities are obtained according to the invention if a mechanical operating device, for example, in the form of an additional manual operating means, is combined with the present invention. This additional operating means may actuate or press on the actuation diaphragm alternately to the fluidic media for deforming the actuation diaphragm and for transmitting that deformation to an actuating device.

BRIEF FIGURE DESCRIPTION

In order that the invention may be clearly understood, it will now be described in more detail with reference to the accompanying drawings, wherein.

DETAILED DESCRIPTION OF PREFERRED EXAMPLE EMBODIMENTS AND OF THE BEST MODE OF THE INVENTION

Figure 1:
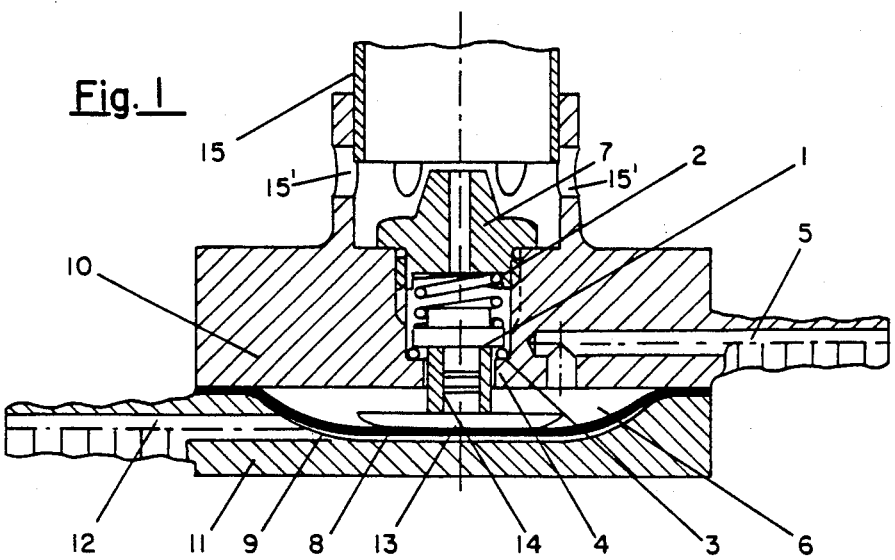
FIG. 1 is a sectional view through a diaphragm drive for the remote control of a laboratory gas burner.

In FIG. 1, the gas burner is shown in its nonburning condition. Only the lower end of the burner tube 15 is shown. In the nonburning condition fuel gas is not supplied from the fuel gas inlet nipple 5 through an outlet nozzle 7 to the burner tube 15, because the valve disk 1 is pressed against the sealing ring 3 of the valve seat 4 by the spring 2. Thus, the nozzle 7 is closed off from the gas supply chamber 6 which is connected to said gas inlet nipple 5. An actuation diaphragm or membrane 8 separates the fuel gas chamber 6 from the pressure chamber 9. Simultaneously, the diaphragm 8 seals the so-called gas disk 10 from the ring plate 11 forming the bottom of the burner. In operation, if a pressure medium such as pressurized air is supplied through the pressure inlet nipple 12 into the pressure chamber 9, the actuation diaphragm 8 will press against the relatively large surface area of the pressure transmitting means in the form of a pressure plate or actuation disk 13 cooperating with a transfer plunger 14 which lifts the disk 1 off the valve seat means 3, 4. Thus, gas supplied through the inlet nipple 5 may now pass from the fuel gas chamber 6 through the free space around the transfer plunger 14 to the nozzle 7 whereby the chamber 6 provides a conduit from the inlet nipple 5 to the outlet nozzle 7. In the burner tube 15 the gas is conventionally mixed with air supplied through openings 15'. The gas-air mixture is then ignited at the top of the burner tube 15 by a conventional pilot light not shown.

Figure 2:
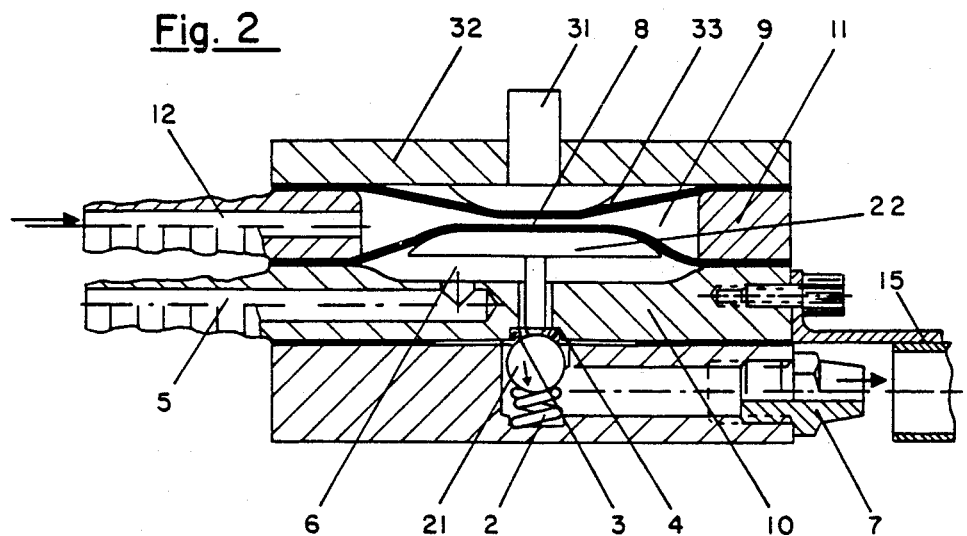
FIG. 2 is a sectional view through a modification of a gas burner comprising the remote control according to the invention in combination with a hand operated control.

FIG. 2 illustrates an actuating device comprising a valve means including a valve ball 21 pressed against the sealing ring 3 of the valve seat 4 by the spring 2. An actuation pin with a mushroom type head 22 rests against the valve ball 21 and is subject to the pressure introduced into the chamber 9 and transmitted onto the mushroom head 22 by the diaphragm or membrane 8.

Additionally or rather in the alternative, the embodiment of FIG. 2 provides for manual actuation of the valve ball 21 through a hand key 31 also provided with a mushroom type of head and slideable in a guide plate 32 for cooperation with a sealing membrane 33. The two mushroom heads are arranged to face each other so that the valve may be actuated even if there is no pressure supplied into the chamber 9 between the sealing membrane 33 and the actuation diaphragm 8. The membrane 33 seals the manual actuating means 31, 32 against the pressure chamber 9.

The movement of the hand key 31 is transmitted through the sealing membrane 33 and through the actuation membrane 8 to the actuation pin head 22 which then operates in the same manner as if it were subjected to pressurized air in the chamber 9 for a remote control operation. In both instances, the valve ball 21 is lifted off its valve seat 4.

Figure 3:
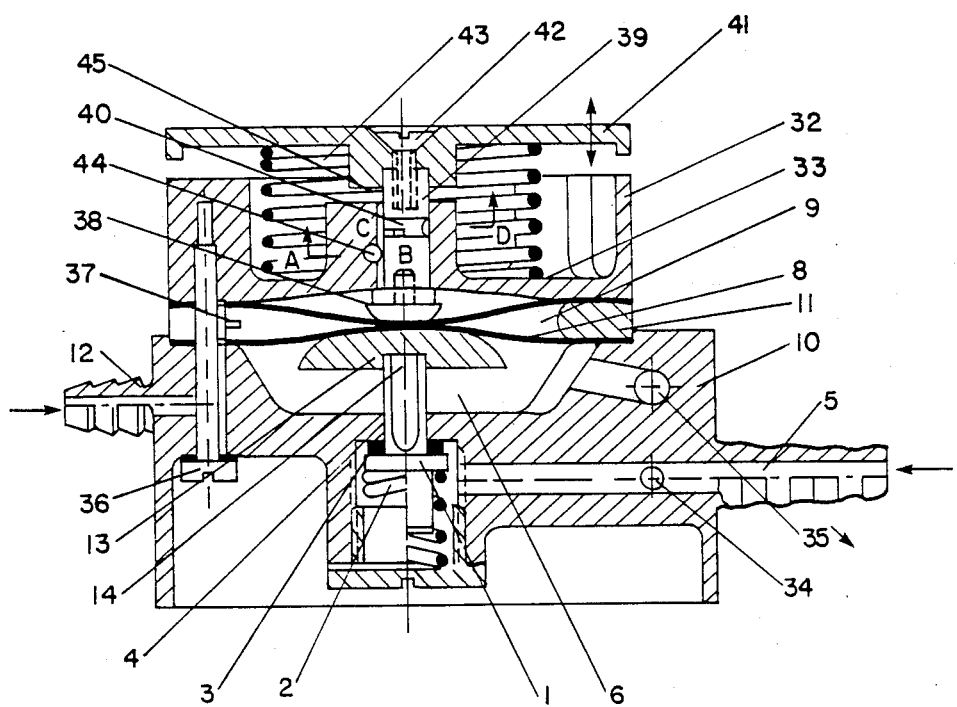
FIG. 3 is a sectional view through a further embodiment in which a conventional gas burner has been susequently equipped with a remote control according to the invention whereby the mechanical operating device constructed as an arrestable or lockable hand actuated member remains fully functional.

FIG. 3 illustrates an embodiment in which the present invention has been incorporated into a conventional gas burner with a manual actuator including a so-called wrist plate 41. A bore 34 branches off from the gas inlet conduit leading from the gas supply nipple 5 to the actuating device. A bore 34 leads to a pilot light for the gas burner not shown. An outlet bore 35 supplies gas from the chamber 6 to the nozzle of the main burner not shown. Pressurized air is supplied from the air inlet nipple 12 around the fastening screw 36 into the ring plate 11 and through an exit slot 37 into the pressure chamber 9 formed between the actuation diaphragm 8 and the sealing membrane 33. As shown in FIG. 3, the ring plate 11 has an inner edge which bulges radially inwardly thereby reducing the volume of the chamber 9. Both membranes 8 and 33 provide in combination a double seal for the gas supply chamber 6.

The conventional manual actuation means of the gas burner comprise a pressure button 38 secured to the lower end of the plunger 39 provided with a locking groove 40. Thus, the button 38 is rotatable to avoid or at least reduce wear and tear on the sealing membrane 33 which otherwise could result from friction. The wrist plate 41 is connected to the plunger 39 by a recessed flat-head screw 42. A reset or holding spring 43 keeps the wrist plate 41 in its starting position when the wrist plate 41 is not actuated. An arresting pin 44 rests against a flat portion 45 of the plunger 39 thereby keeping the plunger 39 from rotating.

When the wrist plate 41 and thus the plunger 39 are pressed downwardly, the plunger 39 may be rotated with the wrist plate 41 whereby the arresting or locking pin 44 engages the arresting groove 40 to keep the actuating device in the depressed position. In this position, the actuating device is depressed. Therefore, gas may continuously flow from the gas inlet nipple 5 into the fuel gas chamber 6 and through the bore 35 to the nozzle not shown. In this position of the actuating device, the main flame of the gas burner will be burning continuously.

Figure 4:
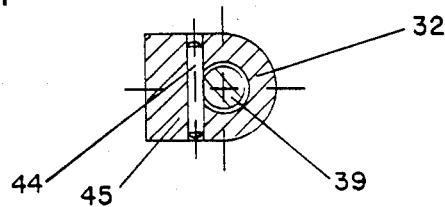
FIG. 4 is a sectional view along section line A B C D in FIG. 3.

FIG. 4 shows how the locking pin 44 rests against the flat portion of the plunger 39 and how the locking groove 40 makes possible the rotation of the plunger 39.

With regard to FIG. 2, it should be mentioned that the sealing membrane 33 performs actually two sealing functions because it seals the guide plate or cover plate 32 against the pressure chamber 9, and it also seals the operating unit with the key 31 relative to the pressure chamber 9.

FIG. 1 illustrates a compact yet safe structure because the actuation diaphragm 8 separates the pressure chamber 9 from the fuel gas chamber 6 and simultaneously performs all sealing functions. Another advantage of the invention is seen in that the durability of the diaphragm 8 and of the membrane 33 may be substantially enhanced because such durability depends primarily on the pressure to which they are exposed and on the movements which they must perform. According to the invention, it is possible to keep the movements small by a suitable selection of the valve dimensions. The required actuation force or power is achieved by a relatively small pressure in the pressure chamber 9 if the actuator device is provided with a large operational surface in contact with the actuating diaphragm, whereby the movement of the actuation diaphragm is transmitted onto such large actuator surfaces as taught here and as shown by the mushroom-type heads, for example 22 in FIG. 2. It has been found to be advantageous to make the operational surface at least four times as large as the surface of the valve seat. Thus, the operational surface of the actuator member, such as 22, should have a diameter twice as large as the diameter of the valve seat. The illustrated mushroom form for the actuator member has been found to be especially suitable for this purpose, particularly if the mushroom is made as a one-piece unit.

In the embodiment of FIG. 1, the actuator disk 13 and its stem in the form of a force transmitting bushing 14 are two separate elements. If desired, the bushing 14 may be in a separate element altogether, or it may form a stem on the valve disk 1. The stem of the actuating member or the bushing 14 may be provided with a flat surface portion or with a groove for increasing the cross-sectional area for the gas passage from the chamber 6 to the burner proper.

Further advantages of the invention are seen in that it may easily be combined with burners of conventional construction having a manually operating device as shown by the button 31 in FIG. 2 and by the wrist plate 41 in FIG. 3. The remote control according to the invention makes it possible to free both hands of the operator for other tasks. Further, the main flame is maintained only as long as it is actually necessary. This in turn has the advantage that the gas consumption is reduced and the heat production is accordingly minimized.

The remote control according to the invention may be made to be operable by a foot switch or foot pedal constructed as a pressure generator, for example in the form of a pressure piston cylinder arrangement or in the form of a rubber ball connected to the diaphragm drive by a hose.

In the embodiment of FIG. 1 in which the actuation diaphragm 8 directly seals off the pressure chamber 9 from the fuel gas chamber 6, the safety of the device is assured even if the actuation diaphragm 8 should rupture because in that instance, the pressure in the chamber 9 is released into the fuel gas chamber 6 whereby the valve closes automatically thereby interrupting the gas flow to the burner. Thus, fuel gas cannot escape in an uncontrolled manner. In the embodiment of FIGS. 2 and 3, an automatic closing is assured when the sealing membrane 33 should rupture because it would release the pressure in the pressure chamber 9. These features of the invention have the advantage that any fault in the diaphragm or membranes incapacitates the remote control by shutting off the gas burner which condition becomes immediately visible.

As mentioned, it is a further advantage of the invention that it may be installed even in presently available conventional burners of suitable construction.

Although the invention has been described with reference to specific example embodiments, it will be appreciated, that it is intended to cover all modifications and equivalents within the scope of the appended claims.

What is claimed is:

1. A diaphragm drive for controlling the operation of a valve manually or automatically in response to a control pressure signal, comprising housing means (10, 32) forming a first fixed volume chamber, a second variable volume pressure chamber (9) in said housing means, said pressure chamber (9) comprising a spacer ring plate (11) defining the circumference of the second variable volume pressure chamber (9), a first flexible membrane (8) and a second flexible membrane (33) held in said housing means and spaced from each other by said spacer ring so that the first and second membranes directly face each other and define side walls of said second variable volume pressure chamber, control pressure inlet means (12, 37) extending into said second variable volume pressure chamber (9) for admitting a valve opening pressure signal into the second variable volume pressure chamber between the first and second membranes, manual actuating means (31, 38) operatively extending through said housing means into said first chamber for direct operative contact with one of said membranes (33) opposite one side of said second variable volume pressure chamber (9), said manual actuating means having a shape effectively reducing the volume of said second variable volume pressure chamber (9) between said first and second membranes, valve means (2, 21, 22; 1, 13, 14) in said housing means also extending into said first chamber for direct operative contact with the other of said membranes (8) opposite the other side of said second variable volume pressure chamber (9), said valve means (13, 22) also having a shape effectively reducing the volume of said second variable volume pressure chamber (9) between said first and second membranes, inlet port means (5) and outlet port means (7, 35) in said housing means, said first chamber forming conduit means (6) in said housing means for interconnecting said inlet port means and said outlet port means through said valve means, said valve means being located in said conduit means (6) for operation by a pressure signal in said second variable volume pressure chamber or by actuation of said manual actuating means which is effective through said first and second membranes, said membranes being so arranged that they move in opposite directions relative to each other when a control pressure signal is introduced into said second variable volume pressure chamber (9) and when a control pressure is released from said second variable volume pressure chamber (9).

2. The diaphragm drive of claim 1, wherein said manual actuating means and said valve means each comprise a large surface area actuating member (22, 31) in contact with the respective flexible membrane, said valve means comprising biasing means (2) for urging the respective actuating member toward the other membrane so that the membranes almost contact each other for forming said pressure chamber so as to have a small volume.

3. The diaphragm drive of claim 1, wherein said spacer ring plate has a radially inwardly reaching edge for reducing the volume of said pressure chamber (9).

4. The diaphragm drive of claim 1, wherein both flexible membranes (8, 33) provide a double seal for said conduit chamber means (6).

5. The diaphragm drive of claim 1, wherein said valve means comprise valve actuator means including a force transfer member having a large surface area in contact with one of said flexible membranes for transmitting the deformation of the flexible membrane, and wherein said valve means have a valve seat of a given seat surface area, said large surface area of said force transfer member being at least four times as large as said valve seat surface area.

6. The diaphragm drive of claim 5, wherein said force transfer member is a mushroom shaped actuation pin.

7. The diaphragm drive of claim 5, wherein said force transfer member comprises a large surface area actuation disk and a transfer plunger arranged for cooperation with said actuation disk.

8. The diaphragm drive of claim 1, wherein said manual actuating means comprise an actuation disk constructed as a so-called wrist plate of sufficient surface area for actuation by a wrist of an operator.

* * * * *